UNITED STATES PATENT OFFICE.

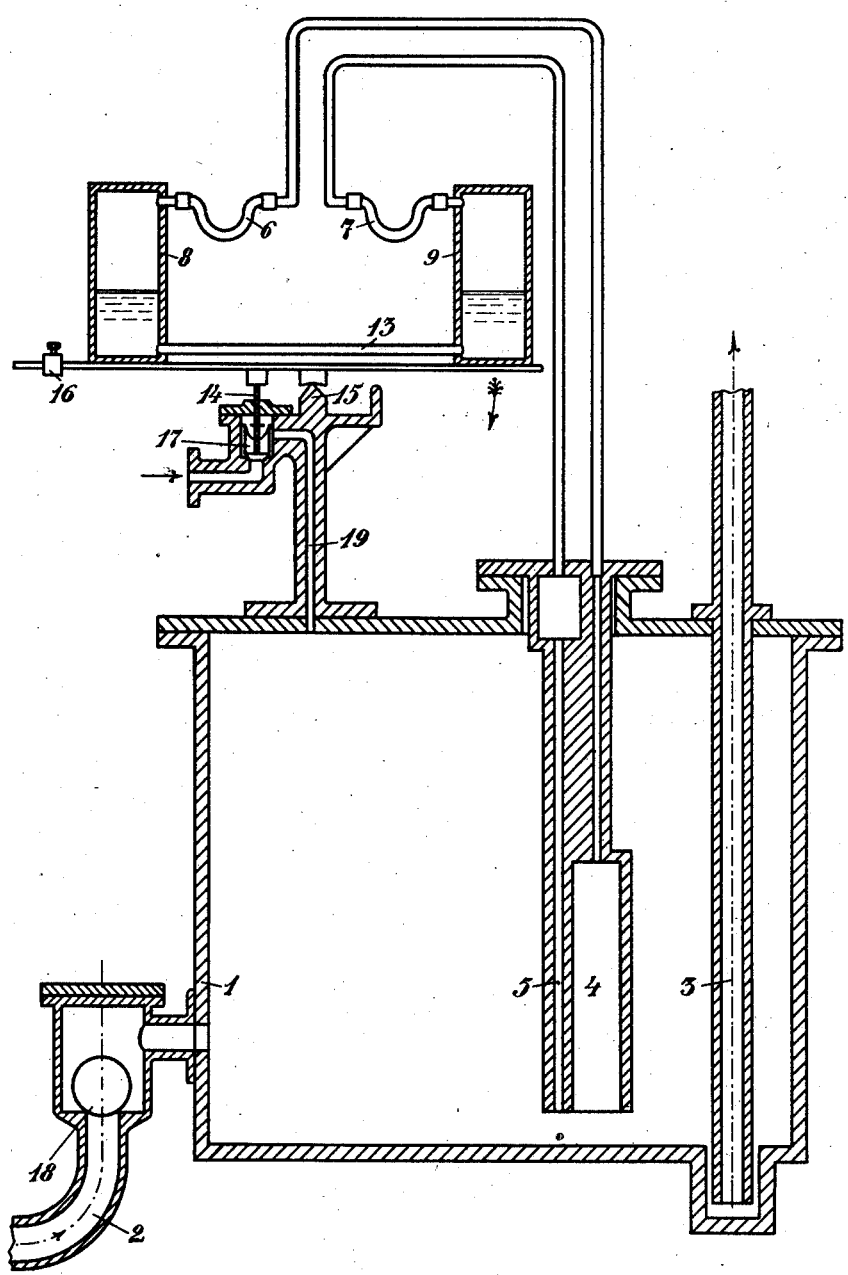

HARRY PAULING, OF GELSENKIRCHEN, GERMANY, ASSIGNOR TO SALPETERSÄURE-INDUSTRIE-GESELLSCHAFT G. M. B. H., OF GELSENKIRCHEN, GERMANY.

VALVE-GEAR FOR APPARATUS FOR RAISING LIQUIDS.

998,388. Specification of Letters Patent. Patented July 18, 1911.

Application filed April 12, 1911. Serial No. 620,670.

*To all whom it may concern:*

Be it known that I, HARRY PAULING, a subject of the King of Prussia, residing at Gelsenkirchen, in the Kingdom of Prussia and German Empire, have invented a new and useful Improved Valve-Gear for Apparatus for Raising Liquids, of which the following is a specification.

This invention relates to apparatus for raising liquids by means of compressed air; and it comprises a receiving vessel or pressure chamber from which the liquid is to be raised, conduits of different cross sections leading from said vessel to communicating liquid-containing chambers which are mounted so as to be rotatable about a fixed point and which constitute a balance device, and a valve adapted to be opened or closed by the operation of said balance device to control admission of compressed air to said vessel; all as more fully hereinafter set forth and as claimed.

In handling liquids of various kinds, particularly acids and the like, it is often desirable to avoid the use of pumps of the usual types where the liquid to be elevated or otherwise conveyed comes in contact with parts liable to be attacked by the liquid in question. For raising such liquids from one level to another, devices commonly known as acid eggs are often employed, wherein the liquid is brought into a receiving vessel, compressed air or other gas is admitted into the vessel, and the liquid is thereby forced out of the vessel through an exit pipe to the desired level. As a rule the operation of such liquid-raising devices involves steps occurring in repeated cycles. A definite amount of liquid is first admitted to the receiving vessel or pressure chamber, compressed air is then admitted to the vessel to expel the liquid therefrom, a second portion of liquid is passed into the vessel and expelled as before, and so on, indefinitely. The air valve controlling the admission of compressed air or other gas is often operated manually, although automatic operation has been proposed. According to one method of automatic operation heretofore proposed, rise of the liquid in the receiving vessel to a certain level closes an electric circuit actuating the valve. But such a device is more or less complicated owing to the fact that two different sources of energy are employed and the relation between the height of liquid in the receiving vessel and the position of the air valve is indirect.

In the present invention the rise of liquid in the receiving vessel is utilized to produce differential pressures in a pair of chambers containing a suitable liquid and connected by a conduit in such a manner that liquid may pass freely from one chamber to the other. The chambers with their connecting conduit constitute what may be termed a balance or balance beam, supported upon a fixed member such as a knife edge located at a convenient point intermediate the ends of this balance. The balance is operatively connected to a compressed air valve in such a manner that rotation of the balance about the knife edge opens or closes the valve. Flexibly connected to the chambers are tubes leading from the upper parts of the chambers to near the bottom of the receiving vessel and serving to transmit to the chambers the pressure due to rise of liquid in the receiving vessel. The portions of the tubes within the receiving vessel should be of different effective cross sections for at least a part of their length. Liquid entering the receiving chamber and rising covers the lower ends of the pressure-transmitting tubes. Further rise of liquid compresses the air in these tubes and in the balance chambers and also forces air into the chambers. But since the tubes differ in cross section, more air is forced into one balance chamber than into the other, and consequently the air pressures in the chambers become unequal. To balance this inequality, liquid flows from one chamber into the other. Liquid continues to rise in the receiving vessel until a point is reached where the transfer of liquid from one balance chamber to the other causes the beam to turn on the knife edge; whereupon the air valve is opened to admit compressed air into the receiving vessel, and the liquid therein is forced out through the exit pipe to some higher level. When the level of liquid in the receiving vessel has fallen below the ends of the tubes, the liquid therein flows out, whereupon equality of the air pressure, and consequently of the liquid levels, in the balance chambers is reëstablished, causing the beam to turn back to its original position and close the compressed air valve. The described cycle of operations is then repeated as often as may be desired, the opening and closing of the air valve occurring automatically and depending directly on the height of liquid in the receiving vessel.

In the accompanying drawings I have shown more or less diagrammatically a typical assemblage of apparatus elements embodying the present invention. In this showing the figure is a sectional elevation of the assembled apparatus.

Referring to the drawings, 1 is a vessel or pressure chamber adapted to receive the liquid to be raised, 2 is an inlet for such liquid provided with ball valve 18, and 3 is an exit pipe leading to any convenient place to which it is desired to convey the liquid. Tubes 4 and 5, which may conveniently be embodied in a double tube as shown, leads from near the bottom of the vessel and are connected by means of flexible tubes 6 and 7 to balance chambers 8 and 9 respectively. Tube 4 is of larger cross section for a part of its length than is tube 5. The chambers contain liquid which may flow from one to the other through conduit 13. The connected chambers are supported upon a suitable base which rests upon knife edge 15, and to this base is attached rod 14 controlling valve 17 of the compressed air inlet. Adjustable weight 16 may be moved to vary the pressure of valve 17 upon its seat as desired. In the position of the balance indicated in the figure, the compressed air is cut off and communication between the receiving vessel and the atmosphere is afforded through passage 19. When the balance turns to lift valve 17 from its seat, this communication is cut off, and the vessel is connected to the source of compressed gas.

The operation of the apparatus is obvious from the foregoing description.

Assuming the initial condition of the apparatus to be as shown in the figure, liquid to be elevated enters pressure chamber 1 through 2, the displaced air passing out through 19 to the atmosphere. When the ends of tubes 4 and 5 become submerged in the rising liquid, the air in the balance chambers is compressed. But by reason of the greater cross section of tube 4, more air is forced by the rising liquid into chamber 8 than into chamber 9. The pressure in 8 thus becomes greater than in 9; and to restore equilibrium, a part of the liquid in 8, which originally stood at the same level as in 9, flows into 9 through 13. This flow into 9 continues with the rise of liquid in the pressure chamber and in the tubes 4 and 5 until the weight of water in 9 becomes sufficiently great to turn the balance in the direction of the arrow, thus raising the air valve from its seat and admitting compressed air to the receiving vessel, while at the same time communication between the vessel and the atmosphere is cut off. The compressed air forces the liquid in the receiving vessel or pressure chamber out through exit pipe 3 to a place of discharge. The increase of pressure in the pressure chamber causes the liquid to rise still higher in tube 4 and 5 and the air in 8 and 9 to be further compressed. But since the relation between the volumes of displaced air remains substantially constant, the balance will remain in its inclined position until the level of the liquid in the chamber falls below the ends of 4 and 5. Air will then enter 4 and 5 and the liquid therein will flow out so that equilibrium is again established in chambers 8 and 9 by the return flow of liquid through pipe 13. This causes the balance to return to its position of rest, closing the compressed air inlet and opening the interior of the receiving vessel to the atmosphere. The described cycle of operations is then repeated automatically.

Instead of using the double tube 4—5, the portion of either 4 or 5 within the receiving vessel may be omitted, the vessel itself then functioning as the tube of larger section.

What I claim is:

1. Valve gear for apparatus for raising liquids by compressed air, comprising, in combination with a pressure chamber having an air valve for the admission of compressed air, two tubes projecting into said pressure chamber of unequal cross section, two chambers communicating with each other and supported like a balance, a pipe connecting each of said tubes with one of said two chambers, and means to connect the chambers so supported with the air valve, substantially as, and for the purpose, set forth.

2. Apparatus for raising liquids, comprising a pressure chamber having a liquid inlet and a liquid outlet, communicating liquid-containing chambers mounted so as to be rotatable about a fixed point, conduits of different cross sections connecting said pressure chamber and such rotatably mounted chambers, and means adapted to be actuated by such rotatably mounted chambers for admitting compressed air to said pressure chamber.

3. Apparatus for raising liquids, comprising a pressure chamber, balance chambers connected by liquid-conducting means and pivotally mounted to operate like a balance, means connecting said pressure chamber and said balance chambers and adapted upon rise of liquid in said pressure chamber to produce differential pressures in said balance chambers, and means actuated by the movement of said balance chambers for admitting compressed air to said pressure chamber.

4. Apparatus for raising liquids, comprising a pressure chamber, valved means for admitting compressed air to said pressure chamber, a balance adapted to open and close said valved means, and means for transmitting air pressure from said pressure chamber to said balance to cause movement of said balance.

In testimony whereof I have signed my name to this specification in the presence of two subscribing witnesses.

HARRY PAULING.

Witnesses:
RICHARD MERKEL,
LOUIS VANDORY.

Copies of this patent may be obtained for five cents each, by addressing the "Commissioner of Patents, Washington, D. C."